US006668962B2

(12) United States Patent
Son

(10) Patent No.: US 6,668,962 B2
(45) Date of Patent: Dec. 30, 2003

(54) HOOD HANGING STRUCTURE FOR A VEHICLE

(75) Inventor: Byeong-Lag Son, Ulsan-shi (KR)

(73) Assignee: Hyundai Motor Company, Seoul (KR)

( * ) Notice: Subject to any disclaimer, the term of this patent is extended or adjusted under 35 U.S.C. 154(b) by 58 days.

(21) Appl. No.: 10/028,550

(22) Filed: Dec. 19, 2001

(65) Prior Publication Data

US 2002/0170759 A1 Nov. 21, 2002

(30) Foreign Application Priority Data

May 18, 2001 (KR) ........................................ 2001-27177

(51) Int. Cl.[7] ............................................... B60R 21/34
(52) U.S. Cl. .................... 180/274; 180/281; 180/69.21
(58) Field of Search ................................ 180/274, 281, 180/69.21

(56) References Cited

U.S. PATENT DOCUMENTS

| 4,078,779 | A | * | 3/1978 | Molders ..................... 267/120 |
| 4,249,632 | A | * | 2/1981 | Lucchini et al. ............ 180/274 |
| 4,388,744 | A | | 6/1983 | Pantke et al. |
| 4,727,621 | A | | 3/1988 | Emery et al. |
| 4,839,941 | A | * | 6/1989 | Orlando ....................... 16/361 |
| 5,557,829 | A | | 9/1996 | Schoen et al. |
| 5,697,467 | A | | 12/1997 | Howard |
| 5,758,389 | A | | 6/1998 | Wolda |
| 6,182,782 | B1 | * | 2/2001 | Matsuura et al. ........... 180/274 |
| 6,182,952 | B1 | | 2/2001 | Gutierrez |
| 6,212,456 | B1 | * | 4/2001 | Stride .......................... 701/45 |
| 6,217,108 | B1 | | 4/2001 | Sasaki |
| 6,237,992 | B1 | * | 5/2001 | Howard ...................... 296/194 |
| 6,330,734 | B1 | * | 12/2001 | Cho ............................. 16/376 |

FOREIGN PATENT DOCUMENTS

| DE | 3515099 | A1 | * | 10/1986 | |
| DE | 19712961 | A1 | * | 10/1998 | ........... B60R/21/34 |
| DE | 10141628 | A1 | * | 3/2002 | |
| DE | 10108882 | A1 | * | 9/2002 | ........... B60R/21/34 |
| EP | 0323065 | | | 12/1988 | |
| EP | 0490645 | | | 12/1991 | |
| EP | 0926018 | A1 | * | 11/1998 | |
| EP | 1078826 | | | 8/1999 | |
| EP | 1238893 | A1 | * | 2/2002 | |
| EP | 1199229 | A2 | * | 4/2002 | |
| GB | 2373218 | A | * | 9/2002 | |
| JP | 4-81369 | | * | 3/1992 | |
| JP | 9315266 | | * | 12/1997 | |
| JP | 9-315266 | | * | 12/1997 | |
| JP | 10152018 | | * | 6/1998 | |
| JP | 1199906 | | * | 4/1999 | |
| JP | 11-115680 | | * | 4/1999 | |
| JP | 11-263191 | | * | 9/1999 | |
| JP | 11-348716 | | * | 12/1999 | |
| JP | 2000-33850 | | * | 2/2000 | |
| JP | 2000-203377 | | * | 7/2000 | |
| JP | 2000211553 | | * | 8/2000 | |
| JP | 2001-138857 | | * | 5/2001 | |
| WO | WO00/69707 | | | 5/2000 | |
| WO | WO00/72101 | | | 5/2000 | |

* cited by examiner

Primary Examiner—Lesley D. Morris
Assistant Examiner—George D Spisich
(74) Attorney, Agent, or Firm—Pennie & Edmonds LLP

(57) ABSTRACT

A hood hinging structure of a vehicle is disclosed to minimize the level of an impact to be made on a pedestrian by changing a hinge structure that allows a hood to be rotatively opened or closed at a vehicle body when the pedestrian is hit by a hood having its hinge structure when the pedestrian is hit by the hinge structure.

14 Claims, 4 Drawing Sheets

HOOD HANGING STRUCTURE FOR A VEHICLE

BACKGROUND OF THE INVENTION

The present invention relates to a hood hinging structure for a vehicle, and more particularly to a hood hinging structure adapted to reduce impact on a pedestrian when a part of the pedestrian's body is bumped by a hood of a moving vehicle body.

In general, a vehicle body is produced through various types of manufacturing processes including molding steps to make various types of steel plates through a press molding or the like, coupling steps like welding and fastening, and a number of types of assembling steps. Among steps, an engine compartment is formed at the front side of the vehicle body for putting a power train type of parts. The engine compartment can be opened or closed with a hood.

Furthermore, the hood is rotatively installed via a hinge structure to the front portion of the vehicle body. In other words, as shown in FIG. 1, the hinge structure 10 includes: a fixing arm member 12 fastened with screws onto a mounting part M of a vehicle body in the left and right edges of the engine compartment, and a rotary arm member 16 with one end of its being hinged at the rear end of the fixing arm member 12 via a rotational pin member 14 and, at the same time, with the other end of its being fastened with screws at the internal sides of a hood (not shown).

Typically, the fixing arm member 12 has a plurality of fastening holes 12a, 12' at its front and rear portions to be fastened onto a mounting part M of the vehicle body with screws. Particularly, the fastening hole 12a' is made at a flange part 12' laterally extended from the rear portion of the fixing arm member 12.

Also, the front part of the rotary arm member 16 has a plurality of fastening holes 16a to be fastened onto the internal side of the hood.

Thus, in the hinging structure 10, the rotary arm member 16 is rotated upward centering a rotational pin member 14 from the fixing arm member 12 screwed at the mounting part M when the hood is opened, and the rotary arm member 16 is rotated downward centering the rotational pin member 14 when the hood is closed.

More recently, the structure of a vehicle body is made with increasing consideration to the safety of riders inside the vehicle during a vehicle crash and to observance of traffic regulations which cover safety of a pedestrian when a moving vehicle collides with a pedestrian. Along with the recent trend as such, there appeared a new organization (EEVC) to evaluate safety of a vehicle body with a test method (EURO-NCAP) that specifies the degree of injury to a pedestrian when hit by a moving vehicle. The testing organization calculates with a particular estimation formula the predictable degree of an injury by all kinds of commercially available vehicles when the vehicle hits a pedestrian on each body part, such as calf, knee, thigh or head, and, then, determines the results of the test in specific number. With reference to the results of tests, consumers may compare and evaluate safety of vehicles in their purchase.

Therefore, in the development of a new model of a vehicle, it should be taken into account that the vehicle is properly made to observe the related traffic regulations and to satisfy requirements specified by the organization that evaluates safety of vehicles.

However, the conventional hood hinging structure has not satisfied a regulation on the level of head injury to a pedestrian particularly in a vehicle accident because the hinge structure 10 is made of a strong material and no space is available between the hinge structure 10 and a vehicle body mounting part to accommodate changes in the position of a hood made by impact of a vehicle crash.

When a pedestrian is hit by a moving vehicle, there may be a first contact between the pedestrian's lower body part and the front part of the vehicle. Then, pedestrian's upper body part is raised along the hood of the vehicle body by inertia, and the head is secondly hit by the hood where the hinge structure is positioned. A test can be conducted with the aforementioned assumptions to see the appropriateness of a hood hinging structure.

In other words, the hinge structure 10 is made of a strong material, which may be impossible to easily change its shape to make a reduction in the level of an impact on a pedestrian's head during an accident. Therefore, a pedestrian may be severely injured when hit by the prior art hinge structure 10.

Accordingly, in order to help protect the pedestrian's head and address the related regulations, it is necessary to develop a hinge structure to help absorb impact energy that generates around the hinge structure 10.

In other words, in order to reduce the level of an injury onto a walker's head, the newly developed hinge structure should be made to effectively absorb the impact energy that generates in an accident.

SUMMARY OF THE INVENTION

It is one object of the present invention to solve the aforementioned problem and to provide a hood hinging structure for a vehicle that reduces or minimizes the level of impact on a pedestrian.

This and other objects are accomplished by the present invention, which includes a hood hinging structure installed between a vehicle body and a portion of the hood to support the hood for opening or closing. In one embodiment of the invention the hinging structure includes an outer housing part fixed to the vehicle body. The outer housing has an open top that receives an inner housing part. The inner housing part is moveable in the outer housing part. A fixing arm member is fixed on the inner housing part, and a first rotary arm member is rotatively fastened to the fixing arm member, with a second rotary arm member rotatively fastened to the first rotary arm member and to the hood. A lifting element is disposed to lift the inner housing part to raise the hood from the vehicle body.

BRIEF DESCRIPTION OF THE DRAWINGS

Objects and aspects of the invention will become apparent from the following description of preferred embodiments with reference to the accompanying drawings in which.

DETAILED DESCRIPTION OF THE INVENTION

Hereinafter, a preferred embodiment of the present invention will be described in detail with reference to accompanying drawings.

Figure 1:
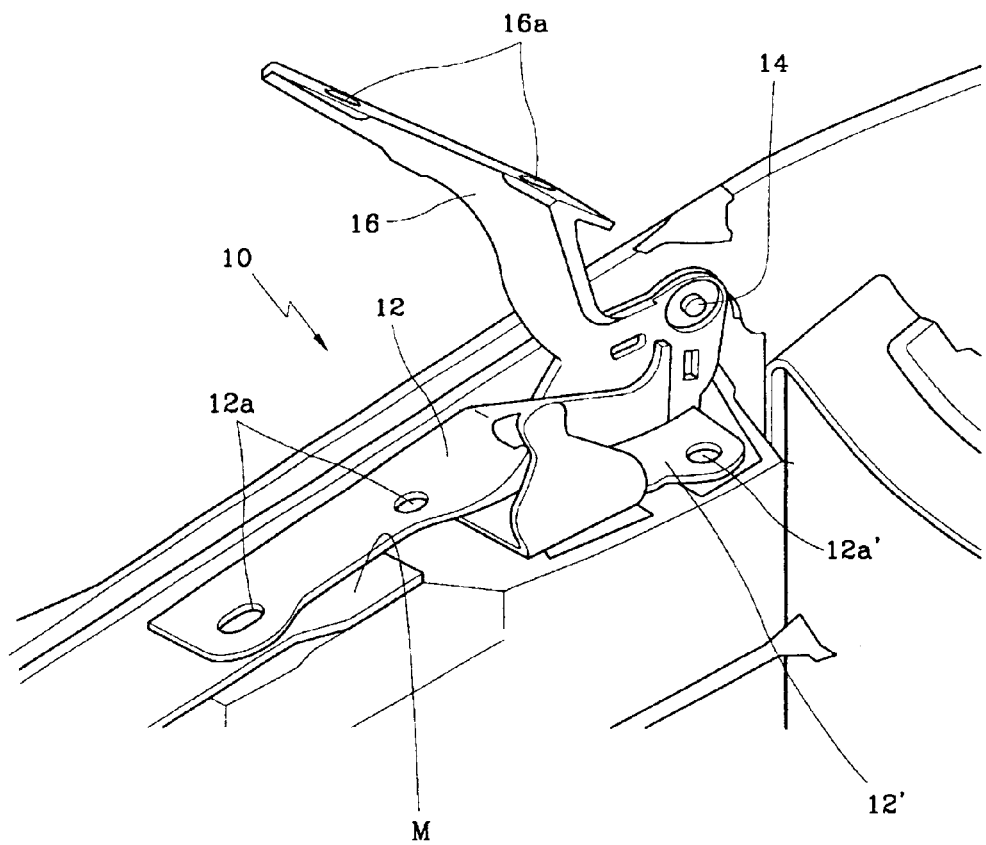
FIG. 1 is a perspective view illustrating the conventional prior art structure for hinging a hood of a vehicle.
Figure 2:
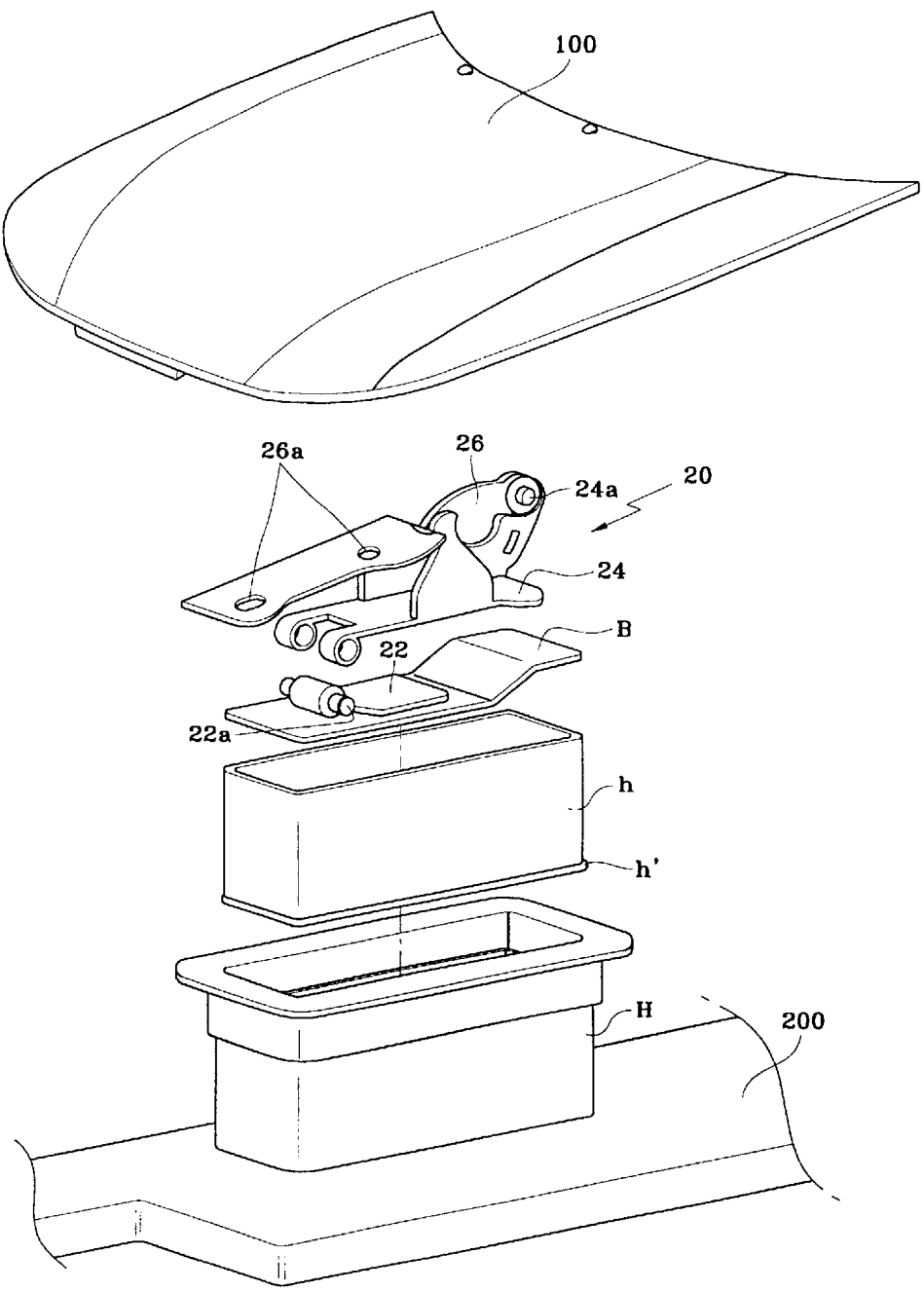
FIG. 2 is an exploded, perspective view illustrating a structure for hinging a hood of a car in accordance with an embodiment of the present invention.
Figure 3:
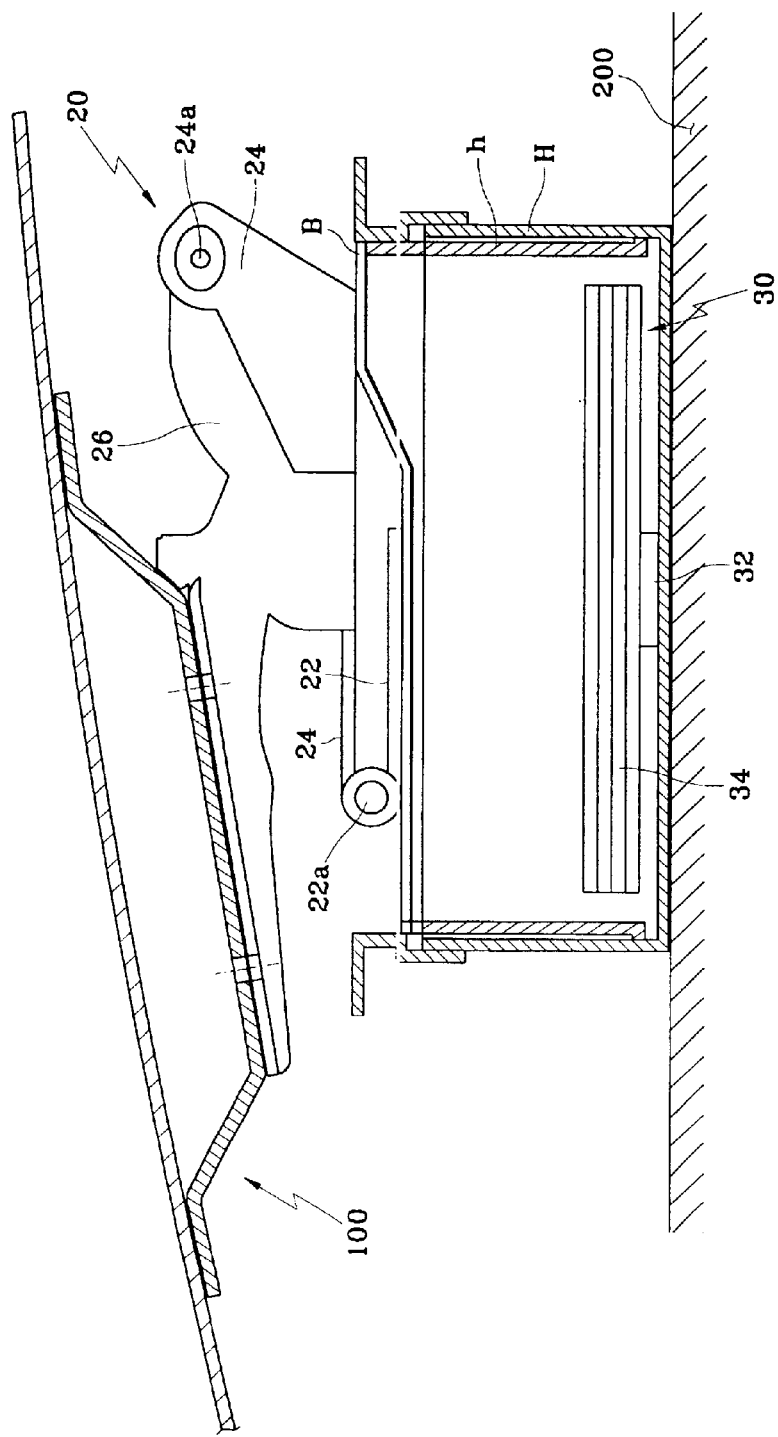
FIG. 3 is a lateral, cross-sectional view illustrating the assembly of a structure for hinging the hood shown in FIG. 2.

FIG. 2 is an exploded, perspective view illustrating the structure for hinging a hood of a car in accordance with the present invention, and FIG. 3 is a lateral, cross-sectional view illustrating the assembly of the hood hinging structure shown in FIG. 2.

In the present invention, as shown in FIG. 2, a hinge structure 20 is installed between a vehicle body and the under portion of a hood 100 to open an engine compartment by rotatively opening or closing the hood. The hinge structure 20 permits the hood to be lifted upward from the vehicle body mounting part 200 in an accident to a position that allows it to absorb energy by subsequently moving downward.

In a preferred embodiment, the hood hinging structure 20 includes: an outer housing part H in a box shape with an open top fixed to vehicle body mounting part 200; an inner housing part h slideably received within the outer housing part H; a fixing arm member 22 fixed on the inner housing part h; a first rotary arm member 24 rotatively fastened to the fixing arm member; a second rotary arm member 26 rotatively hinged onto the first rotary arm member 24 and onto the lower portion of the hood 100; and a lifter 30 (See FIG. 3) constructed to integrally lift upward the fixing arm member 22 and the first and second rotary arm members 24, 26 to take the hood 100 upward and away from the vehicle body mounting part in an accident.

Inner housing part h is constructed with a box having a center hole and a base part B fastened to cover up the center hole. The fixing arm member 22 is fastened and fixed on the base part B. The fixing arm member 22 is rotatively hinged at one end of the first rotary arm member 24 via a first rotational pin 22a. The first rotary arm 24 is rotatively hinged at one end of the second rotary arm member 26 via a second rotational pin 24a. Fastening holes 26a are formed at the front end of the second rotary arm member 26 to be screwed with the hood. Also, a flange h' is formed at the bottom of the inner housing part h to help prevent complete separation from the housing part H.

Fixing arm member 22 and the first and second rotary arm members 24, 26 are all secured at the base part B of the inner housing part h. However, the inner housing part h, having the base part B, can freely lift up or down within the housing part H, so that the fixing arm member 22 and the first and second rotary arm members 24, 26 also freely lift up or down with respect to housing part H.

Figure 4:
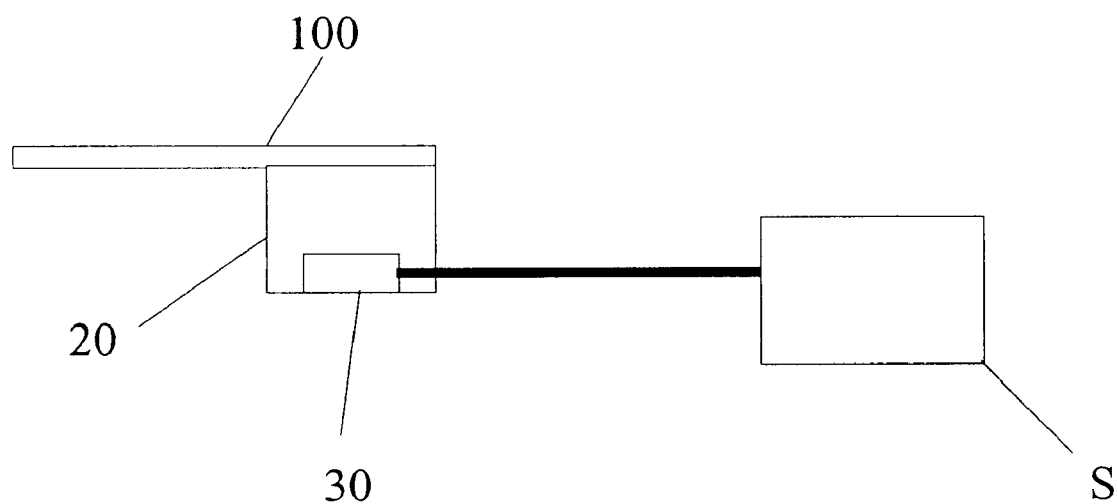
FIG. 4 is a schematic diagram illustrating a control for the present invention.

Lifter 30 includes a trigger 32 having an explosive charge and an expansion body 34 like an accordian or air bag to be expanded in volume by effusion of gas in combustion of the explosion with the trigger. Furthermore, the trigger 32 of the lifter 30 communicates with an air bag impact sensor S (FIG. 4) to ignite the explosive charge by an input of an impact signal generated by the impact sensor in an accident. The gas rupturing out of the explosive charge fills up the expansion body 34.

Accordingly, in a hood hinging structure of the present invention, when an impact signal is transmitted to trigger 32 of the lifter 30 in an accident, the explosive charge in the trigger 32 ignites to effuse gas, the effusion of which expands upward the expansion body 34 accommodated in the housing part H. The expansion of expansion body 34 lifts up the inner housing part h from inside of outer housing part H. The inner housing part h is prevented from completely separation from the housing part H by the flange h'.

As a result, the fixing arm member 22 of the hinge structure 20, fixed at the base part B of the inner housing part h, moves up the first and second rotary arm members 24, 26 at the same time. Thus, the front end of the hood coupled with the second rotary arm member 26 is fastened with the vehicle body via a hood latch and a striker, so that the rear end of the hood is raised up via the lifter 30 by a predetermined level of height (the lifting distance of the inner housing part h).

In other words, the rear end of the hood moves upward from the vehicle body mounting part. At this time, a pedestrian hit by the vehicle first contacts the front of the vehicle body. Then, the pedestrian's upper body is raised along the hood of the vehicle body by inertia, so that the pedestrian's head is secondly hit with the hood where the hinge structure 20 is positioned. However, the lower portion of the hood is apart from the vehicle body mounting part for ready transformation, thereby making it possible to effectively relieve the impact against the pedestrian's head.

If a pedestrian is hit by the hood having the hinge structure 20, the inner housing part h is raised by the expansion body 34 of the lifter 30, to be expanded by the effusion of the gas from combustion of the explosive charge, and then the hood drops down due to the gravity of the expansion body 34 effusing gas and the hood. As a result, it becomes possible to reduce the level of impact that the pedestrian may experience from the hood having the hinge structure 20.

Therefore, when a pedestrian's body is hit at the hinge structure 20 in an accident between a moving vehicle and a pedestrian, the rear end of the hood is raised up apart from a vehicle body mounting part and moved down immediately after the crash, thereby minimizing the level of impact between the vehicle body and the pedestrian and thus addressing related regulations on safety of a pedestrian when the pedestrian is hit by a moving vehicle.

In the hinge structure 20, one end of the first rotary arm member 24 is rotatively coupled with the first rotary arm member 24 fixed at the inner housing part h via the first rotational pin 22a. The second rotary arm member 26 is rotatively coupled with the first arm member 24 via the second rotational pin 24a, to permit the hood to be normally opened or closed. As a result, the hood is freely opened or closed by an instrumental mechanism applied between the first and second rotary arm members 24, 26 rotatively hinged onto the fixing arm member 22.

As described above, there are advantages in the hood hinging structure for a vehicle of the present invention in that the hinge structure 20, installed at the vehicle body mounting part to rotatively open, close and support the hood, is coupled at the inner auxiliary housing part h that can be moved up with a lifter 30, and the rear portion of the hood is rotated and raised up centering its front portion fixed by the vehicle body and a locking unit, thereby making it possible to minimize the level of impact on a pedestrian when the pedestrian is hit by the hinge structure 20, that is, the vehicle mounting part of the hood.

What is claimed is:

1. A hood hinging structure installed between a vehicle body part and a portion of the hood to support the hood to be opened or closed, the hinging structure comprising:

an outer housing part fixed to vehicle body;

an inner housing part moveably received within the outer housing part;

a fixing arm member fixed on the inner housing part;

a first rotary arm member rotatively fastened to the fixing arm member;

a second rotary arm member rotatively fastened to the first rotary arm member and to the hood; and a lift element disposed to lift the inner housing part to raise the hood from the vehicle body, wherein the lift element includes a trigger having an explosive charge and an expansion body to be expanded by effusion of gas from the explosive charge.

2. The structure, as defined in claim 1, wherein the trigger is operated by an impact signal of an air bag generated in a vehicle crash.

3. The structure, as defined in claim 2, wherein the inner housing part includes a base part that couples the fixing arm member and receives operational force from the expansion body of the lift element, and the base part has a flange cooperating with the outer housing part to secure it therein.

4. A mechanism for mounting a vehicle hood to a vehicle body, comprising:
   an expandable housing secured to the vehicle body;
   a hinge structure mounted on the expandable housing opposite the vehicle body, the hood being secured to the hinge structure; and
   a lift member disposed within the expandable housing and cooperating with said housing such that the lift member raises the expandable housing and moves the hood to a position away from the vehicle body, wherein the lift member comprises an explosive charge cooperating with an expansion member to raise the expandable housing.

5. The mechanism according to claim 4, wherein the expansion member is an air bag.

6. The mechanism according to claim 4, wherein the expansion member is an accordion structure.

7. The mechanism according to claim 4, further comprising an impact sensor, wherein said explosive charge is triggered by a signal from said impact sensor.

8. The mechanism according to claim 4, wherein said expandable housing comprises:
   an outer housing part secured to the vehicle body; and
   an inner housing part slidably received within the outer housing part, said hinge structure being disposed on the inner housing part.

9. The mechanism according to claim 8, wherein said inner housing part includes a flange at one end cooperating with the outer housing part to prevent separation of said parts.

10. The mechanism according to claim 4, wherein the hood is moveable from said position away from the vehicle body to a second position towards the vehicle body whereby force of an impact against the hood may be absorbed.

11. A mechanism for mounting a hood on a vehicle body, comprising:
    a hinge structure carrying said hood, said hinge structure being secured to the vehicle body, wherein said hinge structure comprises:
      a fixing arm member mounted on the inner housing part;
      a first rotary arm member rotatively fastened to the fixing arm member;
      a second rotary arm member rotatively fastened to the first rotary arm member, with the hood secured to said second member; and
    means for raising the hinge structure and hood away from the vehicle body in response to a vehicle body impact, wherein said means for raising comprises:
      an outer housing part secured to the vehicle body;
      an inner housing part slidably received within the outer housing part, said hinge structure being disposed on the inner housing part; and
      a lift member disposed within the inner housing part and cooperating the inner housing part such that the lift member raises the inner housing part and moves the hood to a position away from the vehicle body, wherein said lift member comprises an explosive charge cooperating with an expansion member to raise the expandable housing.

12. The mechanism according to claim 11, wherein the expansion member is an air bag.

13. The mechanism according to claim 11, wherein the expansion member is an accordion structure.

14. The mechanism according to claim 11, further comprising an impact sensor, wherein said explosive charge is triggered by a signal from said impact sensor.

* * * * *

UNITED STATES PATENT AND TRADEMARK OFFICE
CERTIFICATE OF CORRECTION

PATENT NO. : 6,668,962 B2　　　　　　　　　　　　　　　　　　　　　　　Page 1 of 1
DATED : December 30, 2003
INVENTOR(S) : Byeong-Lag Son It is certified that error appears in the above-identified patent and that said Letters Patent is hereby corrected as shown below:

<u>Title page, Item [54] and Column 1, line 1,</u>
Title, "HANGING" should be -- HINGING --

Signed and Sealed this

Fifteenth Day of June, 2004

JON W. DUDAS
*Acting Director of the United States Patent and Trademark Office*